United States Patent
Ding

(10) Patent No.: US 8,386,083 B2
(45) Date of Patent: Feb. 26, 2013

(54) SYSTEMS AND METHODS FOR UPDATING VALVE CRACKING CURRENT IN MASS FLOW CONTROLLERS

(75) Inventor: Junhua Ding, Tewksbury, MA (US)

(73) Assignee: MKS Instruments, Inc., Andover, MA (US)

( * ) Notice: Subject to any disclaimer, the term of this patent is extended or adjusted under 35 U.S.C. 154(b) by 543 days.

(21) Appl. No.: 12/139,633

(22) Filed: Jun. 16, 2008

(65) Prior Publication Data

US 2010/0036534 A1    Feb. 11, 2010

(51) Int. Cl.
   G05D 7/06       (2006.01)
   G06F 15/18      (2006.01)

(52) U.S. Cl. .............. 700/282; 700/289; 251/129.02; 73/1.16; 137/487.5; 706/14; 702/35; 702/45; 702/10

(58) Field of Classification Search .............. 700/282, 700/289; 251/129.02; 73/1.16; 706/14; 137/487.5
See application file for complete search history.

(56) References Cited

U.S. PATENT DOCUMENTS

| | | | |
|---|---|---|---|
| 5,472,056 A | | 12/1995 | Orbach |
| 5,810,095 A | | 9/1998 | Orbach et al. |
| 6,759,640 B2 | * | 7/2004 | Yoeda et al. ............ 251/129.16 |
| 7,562,554 B2 | * | 7/2009 | Yoo et al. ................. 73/1.72 |
| 2002/0088956 A1 | * | 7/2002 | Ozawa et al. ........... 251/129.01 |
| 2004/0246649 A1 | * | 12/2004 | Besen ....................... 361/170 |
| 2007/0158607 A1 | * | 7/2007 | Fey et al. .............. 251/129.16 |
| 2007/0215206 A1 | * | 9/2007 | Lull et al. .................. 137/10 |
| 2007/0233412 A1 | * | 10/2007 | Gotoh et al. ............... 702/100 |
| 2008/0042087 A1 | * | 2/2008 | Pfaff ......................... 251/129.04 |
| 2008/0178827 A1 | * | 7/2008 | Ervin et al. ............... 123/90.11 |
| 2009/0213521 A1 | * | 8/2009 | Bedingfield .............. 361/194 |
| 2009/0222180 A1 | * | 9/2009 | Kraenzlein et al. ......... 701/59 |

FOREIGN PATENT DOCUMENTS

| | | |
|---|---|---|
| DE | 60207609 T2 | 8/2006 |
| DE | 102006011350 | * 9/2007 |
| EP | 1457856 A1 | 9/2004 |
| JP | 2006017181 | 1/2006 |

OTHER PUBLICATIONS

Vickers, "Proportional Valves", 1993, pp. 1-11.*
International Search Report and the Written Opinion from corresponding PCT Application No. PCT/US2009/031498 dated Jan. 7, 2011.

* cited by examiner

*Primary Examiner* — Jeffrey A Gaffin
*Assistant Examiner* — Olvin Lopez Alvarez
(74) *Attorney, Agent, or Firm* — McDermott Will & Emery LLP

(57) ABSTRACT

A valve system for a mass flow controller that controls a flow rate of a fluid is disclosed. The valve system includes a valve movable between an open position and a closed position to adjust the flow rate of the fluid to a desired set point, and a valve controller. The valve controller sends a valve current through the valve, so as to adjust the flow rate of the fluid until an actual measured flow rate of the fluid substantially equals the desired set point. The valve controller monitors the valve current and the flow rate when the valve is moving to the closed position, determines a value of the valve current when the fluid has near-zero flow rate, and updates the valve cracking current for a next run, by setting the updated valve cracking current to the value of the valve current at the near-zero flow rate.

15 Claims, 5 Drawing Sheets

SYSTEMS AND METHODS FOR UPDATING VALVE CRACKING CURRENT IN MASS FLOW CONTROLLERS

BACKGROUND

A mass flow controller (MFC) is a device that sets, measures, and controls the rate and amount of fluid passing through the device. The fluid may be of any type, including but not limited to gas, vapor, or liquid, by way of example. These devices are typically designed and calibrated to control with high precision the flow of fluid within a predefined range of flow rates. Some manufacturing processes, such as semiconductor manufacturing, require precise control of the rate of fluid flow and the amount (mass) of gases and vapors that are being delivered to a process chamber or tool.

Applications of MFCs include, but are not limited to, metering of precise amounts of gases and vapors flowing into a process chamber for subsequent deposition on work pieces, dry etching to remove material, ion and plasma beams used in the semiconductor and pharmaceutical industries, etc. In many of these applications, accuracy of fluid flow rates and fluid mass is important in order to ensure optimal results.

The control valve is an important component in an MFC. It regulates the mass flow rate of the fluid, by varying the degree or amount by which the valve is open, according to the control command set by the MFC. The minimum electric current in the valve actuator which causes the valve plug to begin to open is commonly referred to as the valve cracking current or the valve threshold current.

To update the valve cracking current, methods have been used that require pressure information, i.e. require an embedded pressure sensor in the MFC to monitor the operating condition. Not all MFCs, however, include an embedded pressure sensor, making it difficult for such MFCs to update the valve cracking current when such methods are used. Also, these methods may not correctly predict the valve cracking current if the valve is drifted.

Systems and methods that allow the valve cracking current to be correctly determined and updated, without requiring pressure information, is desirable, and would improve control performance of MFCs at different pressures.

SUMMARY

A valve system for a mass flow controller is configured to allow the valve cracking current of a mass flow controller to be updated, without requiring pressure information. The valve system includes a valve that is movable between an open position and a closed position to adjust the flow rate of the fluid to a desired set point.

The valve system further includes a valve controller configured to control the valve so as to adjust the flow rate of the fluid until the actual measured flow rate of the fluid substantially equals the desired set point. The valve controller is configured to: monitor the valve current and the flow rate of the fluid while the valve is moving to the closed position; measure a value of the valve current when the fluid has a near-zero flow rate; and update the valve cracking current for a next run of the mass flow controller, by setting the updated valve cracking current to the measured value of the valve current at the near-zero flow rate.

DETAILED DESCRIPTION

In the present disclosure, systems and methods are described for updating the valve cracking current of an MFC without requiring pressure information, thereby improving the control performance of the MFC at different pressures.

Figure 1:
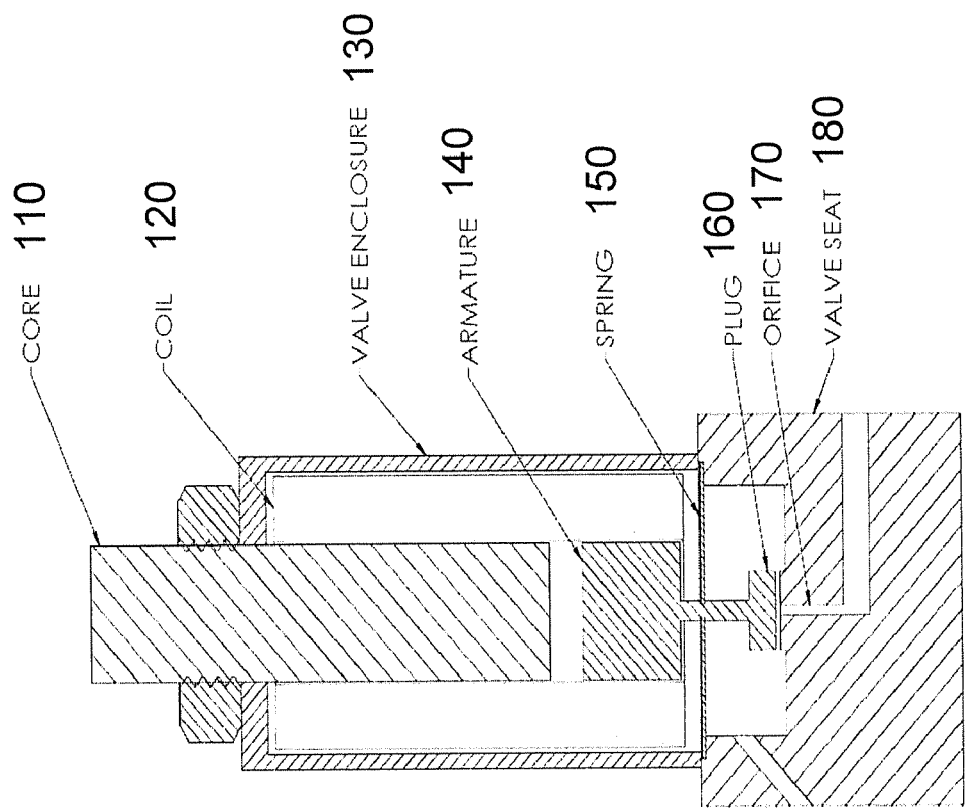
FIG. 1 schematically illustrates a solenoid valve used in a mass flow controller.

FIG. 1 illustrates one example of a control valve for an MFC. As shown in FIG. 1, a control valve in an MFC may include a valve seat 180 with a orifice 170, and a plug 160 which is pushed by a spring 150 to seal against the orifice 170 on the valve seat 180. In the control valve illustrated in FIG. 1, the gap between the plug 160 and the valve seat 180 determines how fully the valve is open. The plug is usually attached to a valve actuator in order to vary the degree of how fully the valve is opened.

The illustrative control valve shown in FIG. 1 uses a solenoid actuator, that includes an armature 140, which is made of ferromagnetic material and is attached to the plug 160, and a wire coil 120. The solenoid actuator further includes a valve core 110 and a valve enclosure, both made of ferromagnetic material. While a solenoid actuator is illustrated in FIG. 1, many other types of valve actuators may be used.

When an electrical current is applied to the wire coil 120, an electromagnetic field is formed in the valve actuator, and the armature 140 is pulled by the magnetic force to the fixed valve core 110. If the magnetic force on the armature 140 is greater than the sum of the preloaded spring force and the force caused by the pressure difference across the orifice, the plug 160 will begin to move away the valve seat 180, thus changing the degree or amount by which the valve is opened.

The minimum electric current that must flow in the valve actuator in order to cause the valve plug to begin to open is referred to as the valve cracking current. In other words, when the valve current reaches a value substantially equal to the valve cracking current, the valve plug 160 begins to move away from the valve seat 180, and the valve starts to move.

Figure 2:
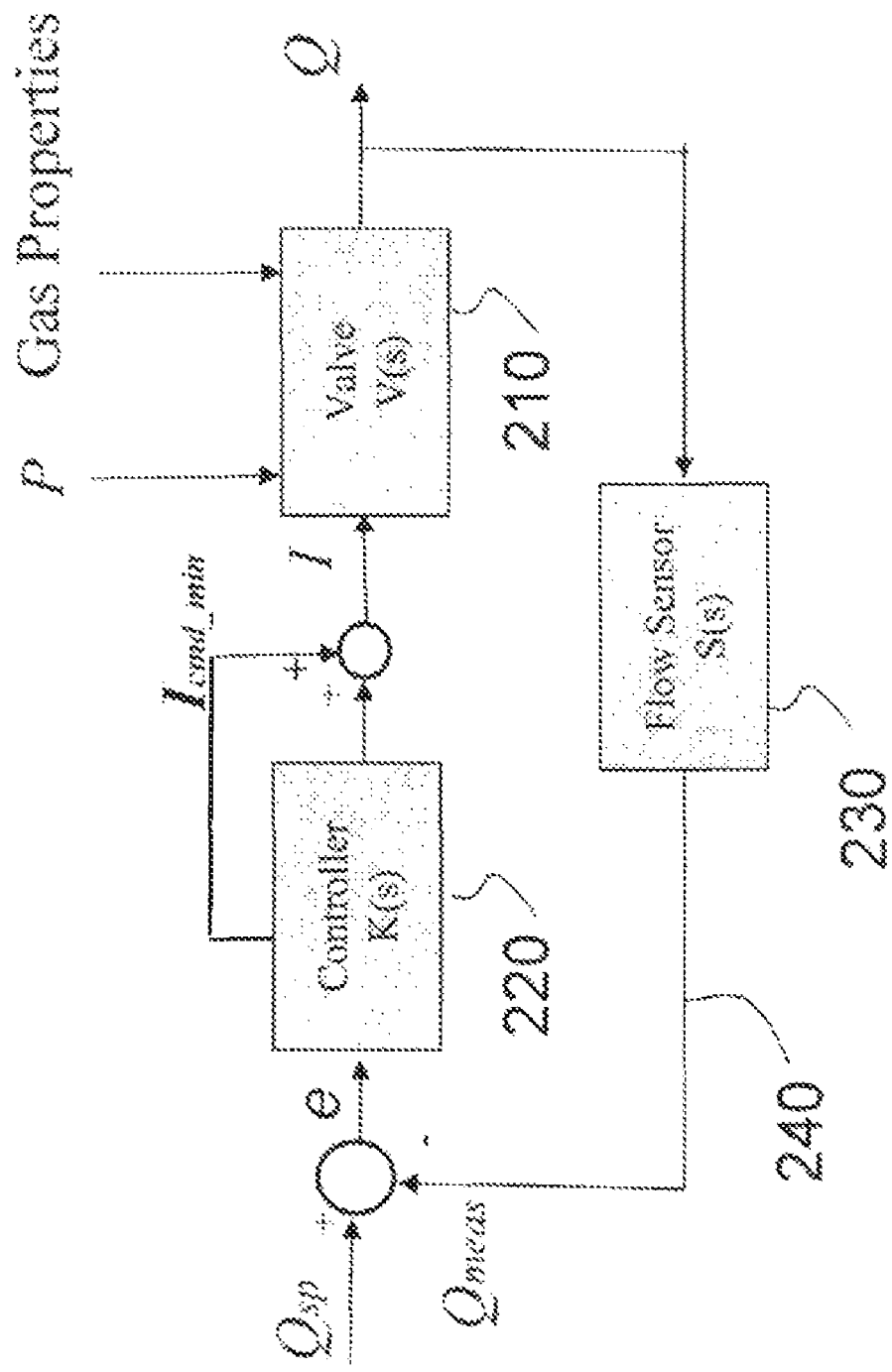
FIG. 2 schematically illustrates a feedback control diagram for a mass flow controller using a valve cracking current to speed up the response.

In many MFCs, the valve cracking current is utilized as a valve bias current in a closed loop feedback control system, which is illustrated in FIG. 2. As shown in FIG. 2, instead of ramping up the valve current from zero to a final value and taking up time in the process, an MFC can directly command the valve to the initial opening position by applying the valve cracking current first, and then using a feedback control loop to drive the valve to the final position. In this way, the valve cracking current speeds up the valve response to the change in flow setpoint from zero to a non-zero value.

If the valve cracking current is set too low, however, a slow response is expected. On the other hand, if the valve cracking current is set too high, an overshoot occurs. In order to achieve good control performance in MFCs, it is important to correctly set the valve cracking current.

The valve cracking current is a function of factors that include, but are not limited to: the pressure difference across the valve orifice, the size of the valve orifice, and the preloaded spring force. In MFC manufacturing, an initial valve cracking current can be determined during the calibration and/or tuning procedures using a known condition, for example the pressure difference across the valve orifice. When the pressure value used by an end-user differs from that used during calibration and/or tuning, it is desirable that the MFC be a smart. MFC that knows the change in the operating condition, and adjust the valve cracking current accordingly.

FIG. 2 schematically illustrates a valve 210 and a feedback controller 220 in a MFC, and a valve cracking current $I_{cmd\_min}$ that is sent to the valve 210 by the controller 220 as the valve bias current to speed up the valve response to nonzero flow setpoint change. In a feedback loop 240 shown in FIG. 2, a flow set point $Q_{sp}$ (i.e., a desired set point for the flow rate of the fluid) is provided to the controller 120. For example, the flow set point $Q_{sp}$ may be input by a user, although the flow set point $Q_{sp}$ may also be input by other methods. The actual output flow rate Q is then measured by a flow sensor 230 in the MFC.

The output flow rate Q through the valve depends on a number of parameters. One parameter is the degree or amount by which the valve is open. This is determined by the valve current, i.e. the control current that is output from the controller 220 and flows to the valve 210. As indicated in FIG. 2, the flow rate Q is also determined by the fluid pressure P, as well as the gas properties of the fluid such as molecular weight and specific heat ratio. In actual applications, the fluid and the upstream pressure are pre-determined. The MFC can only change the flow rate by adjusting the degree or amount by which the valve is open, which in turn is achieved by adjusting the valve current.

Based on the error or difference between the flow set point $Q_{sp}$ and the actual measured flow rate $Q_{meas}$, the controller 220 generates a valve command current which is sent to the valve 210 to control the degree or amount by which the valve 210 is open, so as to maintain the fluid flow rate at the received set point $Q_{sp}$.

The symbol $I_{cmd\_min}$ in FIG. 2 stands for the valve cracking current which acts as a bias or additional valve current to the controller 220 output. As the magnitude of the valve current increases, the magnitude of electromagnetic force increases. When the value of the valve current reaches the value of the valve cracking current, the electromagnetic force is equal to the preloaded spring force plus the pressure difference force across the valve. At this point in time, the valve starts to open.

The magnitude of the valve cracking current, i.e. the minimum amount of valve current needed in order for the valve to open, relates to the preloaded spring force on the valve. If there is a lot of preloaded spring force on the valve, a larger valve cracking current is required in order to open the valve, compared to the situation in which there is a lesser preloaded spring force. The value of the valve cracking current $I_{cmd\_min}$ also depends on the pressure difference across the orifice of the valve. In many applications, the downstream pressure of MFCs is close to vacuum, so that the pressure difference across the orifice of the valve can be approximated as the upstream pressure of the valve or the inlet fluid pressure P. Therefore, the valve cracking current can be expressed as a function of the upstream pressure P as follows:

$$I_{cmd\_min}=f(P).$$

As seen in FIG. 2, the command(s) regarding the value of the valve cracking current can be added to the control command issued by the controller 220, In other words, the valve cracking current basically acts as a bias current or an offset current to the controller 220. An improper valve cracking current causes either an overshoot, or a slow response. In the case of overshoot, an initial valve cracking current is set pretty high. As the valve suddenly jumps to the high initial cracking current, the valve is opened too much and a lot of flow goes through, causing overshoot. On the other hand, if the valve cracking current is set too low, the controller has to ramp up the current until the valve opens, taking up time and causing undershoot.

Figure 3:
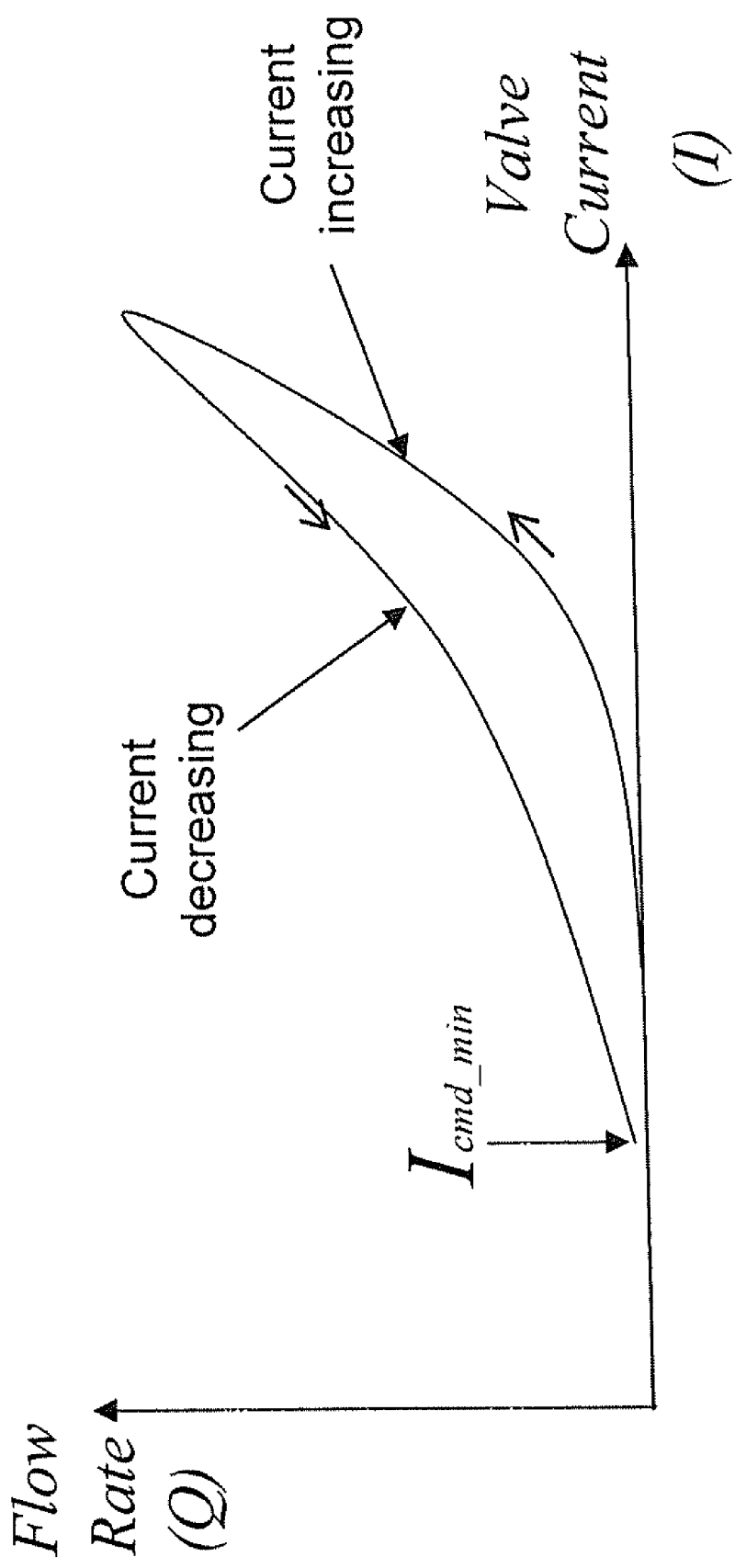
FIG. 3 schematically illustrates a method of updating the valve cracking current, in accordance with one embodiment of the present disclosure.

FIG. 3 schematically illustrates a proposed method of updating the valve cracking current, in accordance with one embodiment of the present disclosure. The basic idea is to monitor both the valve current I and the flow rate Q, while the valve is closing. During a valve closing period, the current I is decreased (or ramped down) slowly, instead of being turned off abruptly. The flow rate Q also decreases with the decrease in current I. As the current is ramped down, the flow rate Q is monitored. Then, the value of the current corresponding to a near-zero flow is learned, and the new or updated value of the valve cracking current is set to that value.

When the valve is opening, more valve cracking current is generally required, whereas when the valve is shutting, much less valve cracking current is generally required. This behavior is commonly called the hysteresis of solenoid actuators, which is also illustrated in FIG. 3. By choosing the new valve cracking current conservatively, i.e. choosing the value of the current at near zero flow when the valve is closing, an overshoot problem can be prevented at the next run of the MFC with the received flow set point $Q_{sp}$ from zero to a nonzero value.

A near zero flow is chosen as the point for learning the new valve cracking current, rather than exact zero flow, because among other things an MFC typically has zero drift or leak, which prevents the MFC having exact zero flow even when the valve current is zero. For this reason, some small percentage of full scale flow may be chosen for near zero flow condition. For example, about a half-percent of the full scale flow may be chosen as the condition at which the new valve cracking current is learned, as just one example.

In order to learn the correct valve cracking current, the MFC must first determine whether the set point has changed from nonzero to zero so that the valve is moving to the closing position; then the MFC must determine that the previous nonzero set point is a predetermined percentage of a full scale value; and finally the MFC must determine whether or not the actual flow rate has been attained for the previous nonzero set point. Only when all these conditions have been met will the new valve cracking current will be learned and updated for the next run.

Figure 4:
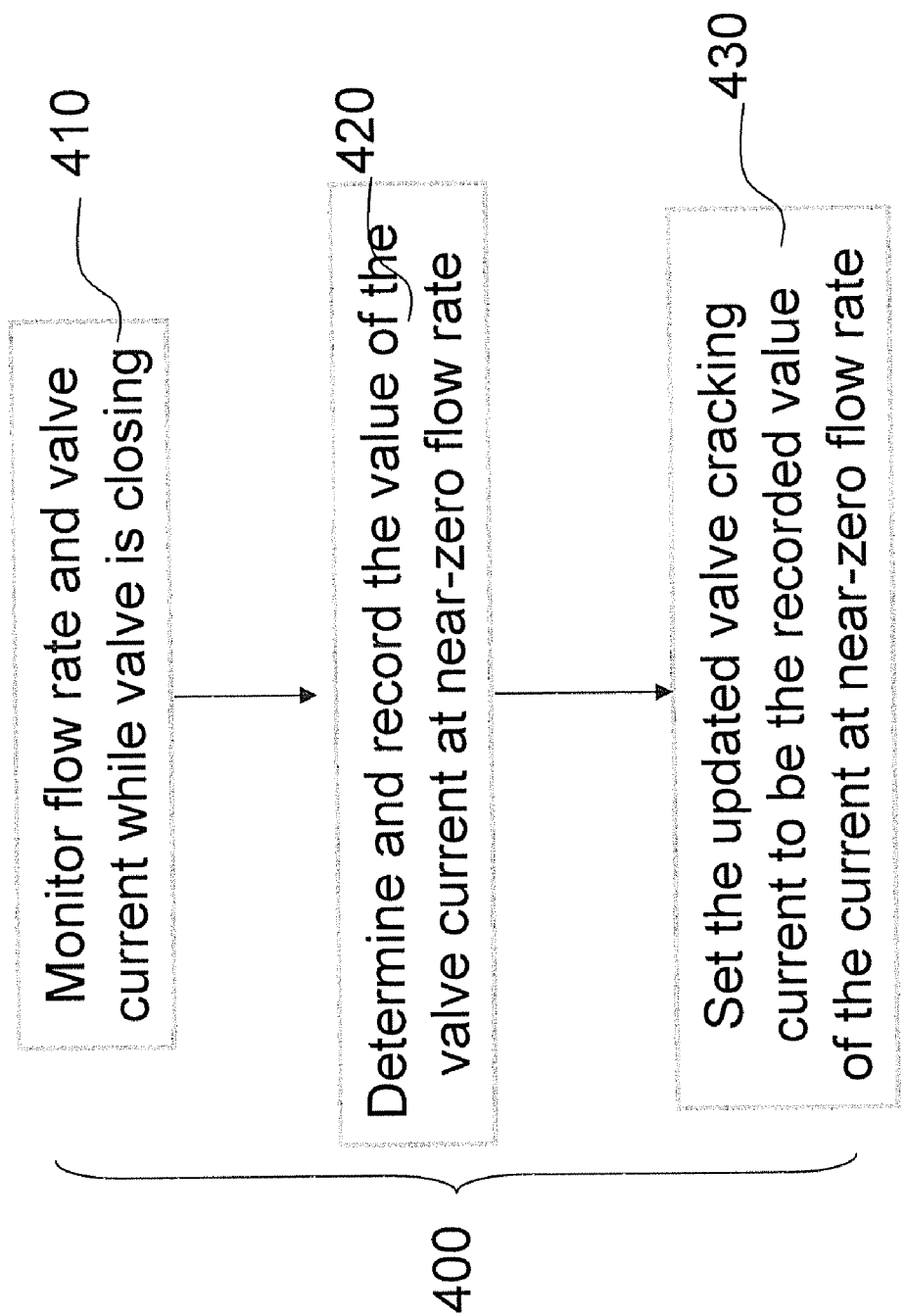
FIG. 4 schematically illustrates a method of updating the valve cracking current, in accordance with one embodiment of the present disclosure.

FIG. 4 is a schematic flow chart that sets for the steps or acts included in the method illustrated in FIG. 3. As shown in FIG. 4, a method 400 of updating valve cracking current, in accordance with one embodiment of the present disclosure, may include the act 410 of monitoring the flow rate of the fluid, and a valve current sent by the valve controller through the valve, while the valve is moving toward the closed position. The method 400 may further include the act 420 of determining and recording a value of the valve current when the fluid has a near-zero flow rate. The method 400 may further include the act 430 of updating the valve cracking current by setting the valve cracking current for a next run of the mass flow controller to the value of the valve current at the near-zero flow rate.

The above-described method may be computer-implemented, in which case the method would be performed using a processing system that includes a computer-readable medium having stored therein computer-readable instructions. These instructions, when read and implemented by the processing system, may cause the processor to monitor a flow rate of a fluid in a mass flow controller, and a valve current through a valve in the mass flow controller when the valve is moving toward a closed position; determine a value of the valve current when the fluid has a near-zero flow rate; and update the valve cracking current, by setting the valve cracking current for a next run of the mass flow controller to the value of the valve current at the near-zero flow rate. The computer-readable medium may be of any kind known in the art, including but not limited to hard disks, floppy diskettes, CD-ROMs, flash memory, and optical storage devices. The computer readable instructions discussed above may be provided through software that is distributed through the Internet.

Figure 5:
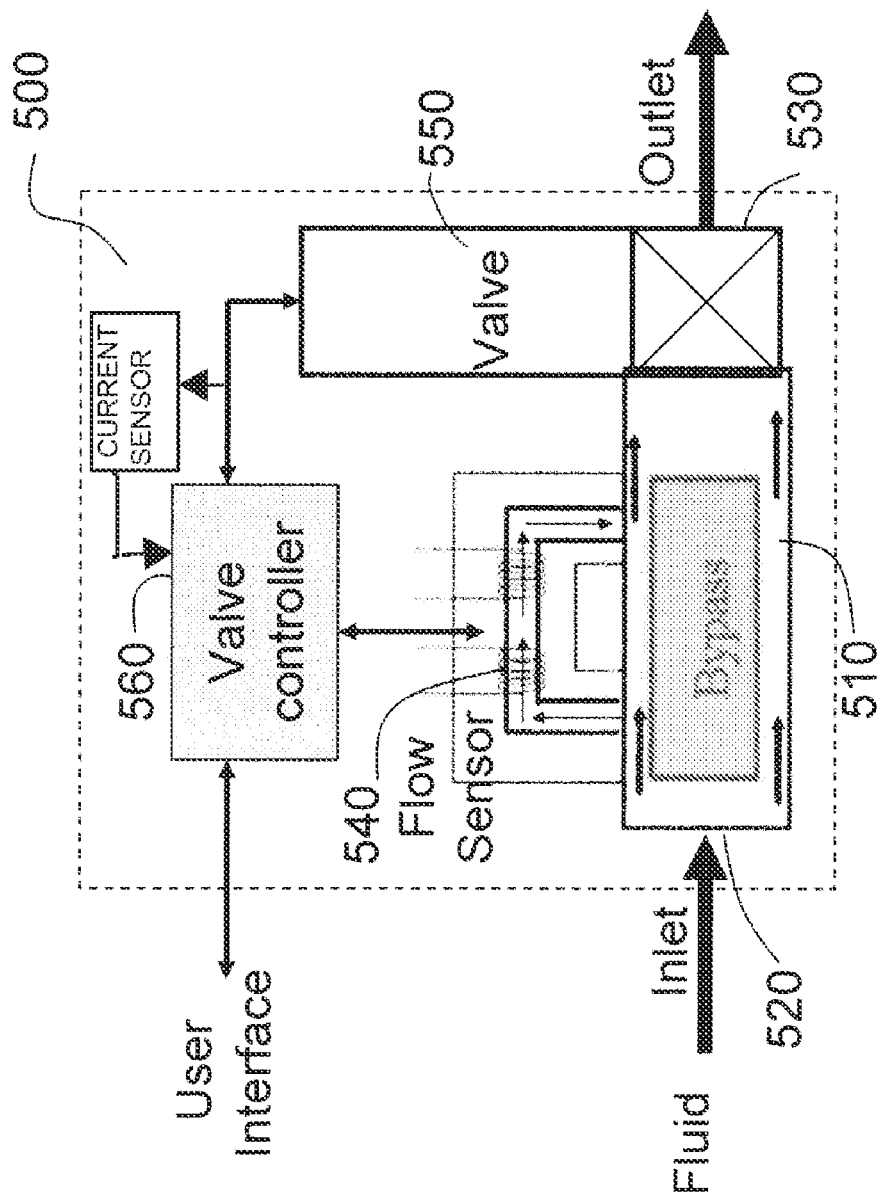
FIG. 5 schematically illustrates an MFC that is configured to update the valve cracking current without requiring pressure information, in accordance with one embodiment of the present disclosure.

FIG. 5 schematically illustrates an MFC 500 that is configured to update the valve cracking current, in accordance with one embodiment of the present disclosure. Like conventional MFCs, the MFC 500 includes a flow body 510, and a mass flow sensor 540. The MFC 500 also has a valve system that includes a valve 550, and a valve controller (or microcontroller) 560 that controls the valve 550. The flow body 510 receives a fluid at an inlet 520 thereof, and provides a flow path for the fluid between the inlet 520 and an outlet 530. The mass flow sensor 540 measures the flow rate of the fluid as the fluid flows from the inlet 520 to the outlet 530 of the MFC 500. The valve 550 regulates the flow of the fluid at a desired flow rate. By opening and closing the valve 550, the mass flow rate of the fluid flowing through the flow path can be adjusted as desired. The valve 550 is typically moved or actuated by a valve actuator, examples of which include, but are not limited to, solenoid actuators, piezoelectric actuators, and stepper motor actuators.

A valve controller 560 controls the operation of the valve 550. The control electronics in the valve controller 560 controls the position of the valve 550 based upon a flow set point indicative of the mass flow rate of fluid that is desired. The mass flow sensor 540 may send a feedback signal indicative of the actual measured mass flow rate of the fluid. Traditional feedback control methods are used to control the flow of fluid in the MFC. In such feedback control methods, a control or command signal is generated by the controller, based upon an error signal that results from the difference between the flow set point and the feedback signal indicative of the actual mass flow rate sensed by the mass flow sensor.

As with conventional MFCs, the valve 550 is movable between a fully open position and a fully closed position to adjust the flow rate of the fluid to a desired set point. As explained above, the valve 550 begins to move when the valve current through the valve substantially equals the valve cracking current. The valve controller 560 controls the valve 550 so as to adjust the flow rate of the fluid until an actual measured flow rate of the fluid substantially equals the desired set point.

In the present disclosure, the valve controller 560 is additionally configured to monitor the valve current and the flow rate of the fluid, when the valve is moving to the closed position. The valve controller 560 is further configured to determine the valve current when the fluid has a near-zero flow rate, and to update the valve cracking current for the next run of the mass flow controller by setting the updated valve cracking current to the value of the valve current at the near-zero flow rate.

The valve controller 560 is also configured to receive the desired flow set point, compare the desired flow set point to the actual flow rate of the fluid as measured by the flow rate sensor. If the actual flow rate does not equal the desired set point, the valve controller adjusts the position of the valve until the actual flow rate substantially equals the desired set point. The valve controller 560 is further configured to adaptively learn the updated valve cracking current for the next run, only when the desired set point is changed from nonzero to zero so that the valve is moving to the closing position.

In sum, systems and methods have been described for updating the valve cracking current in MFCs. These systems and methods greatly improve the control performance of MFCs at different operating conditions such as different inlet fluid pressures. Further, these systems and methods allow long term drift of the MFC valve to be automatically correct.

It is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A valve system that allows a required value of a valve cracking current of a mass flow controller to be updated, the mass flow controller being configured to control a flow rate of a fluid through the valve system, the valve system comprising:
    a valve movable in response to a valve current between an open position and a closed position to adjust the flow rate of the fluid to a desired set point, the valve being configured to begin to move to the open position when a valve current substantially equals the valve cracking current; and
    a valve controller configured to control the valve so as to adjust the flow rate of the fluid until an actual measured flow rate of the fluid substantially equals the desired set point, the valve controller being further configured to:
        (a) monitor the valve current and the flow rate of the fluid, while the valve is moving to the closed position and the valve current and the flow rate are both decreasing;
        (b) measure a value of the valve current when the fluid has a near-zero flow rate; and
        (c) update a previously determined value of the valve cracking current for a next run of the mass flow controller, by setting the updated valve cracking current to the value of the valve current at the near-zero flow rate;
        wherein the near-zero flow rate is defined as a predetermined percentage of maximum flow rate through the valve.

2. The valve system of claim 1, wherein the valve controller is further configured to receive the desired set point, receive the actual measured flow rate from a flow rate sensor in the mass flow controller, compare the desired set point to the actual measured flow rate of the fluid, and if the actual measured flow rate does not equal the desired set point, adjust the position of the valve until the actual flow rate substantially equals the desired set point.

3. The valve system of claim 2, wherein the valve controller is further configured to adaptively learn the updated valve cracking current for the next run, only after determining that the desired set point has changed from nonzero to zero so that the valve is moving to the closing position, the received set point is at a predetermined percentage of a full scale value, and the flow rate has attained the received set point.

4. The valve system of claim 1, wherein the valve includes a valve actuator, and the valve actuator comprises at least one of: a solenoid actuator; a piezoelectric actuator; a stepper motor actuator; and a linear motor actuator.

5. The valve system of claim 1, wherein the valve controller includes a feedback valve control system, and is configured to update the valve cracking current for the next run of the mass flow controller by setting the updated valve cracking current in the feedback valve control system to the value of the valve current at the near-zero flow rate.

6. A method of updating a valve cracking current in a mass flow controller that controls a flow rate of a fluid, the mass flow controller including a valve movable between an open position and a closed position and a valve controller configured to control the valve position so as to adjust the flow rate of the fluid to a desired set point, the method comprising:
monitoring the flow rate of the fluid, and a valve current sent by the valve controller to the valve, when the valve is moving toward the closed position;
determining a value of the valve current when the fluid has a near-zero flow rate; and
updating a previously determined value of the valve cracking current, by setting the valve cracking current for a next run of the mass flow controller to the value of the valve current at the near-zero flow rate;
wherein the near-zero flow rate is defined as a predetermined percentage of maximum flow rate through the valve.

7. The method of claim 6, further comprising the acts of:
receiving the desired set point;
determining whether the desired set point has changed from nonzero to zero so as to determine that the valve is moving to the closed position;
determining whether the received set point is at a predetermined percentage of a full scale value so as to define the near-zero flow rate, and the actual flow rate has attained the received set point; and
updating the valve cracking current by setting the valve cracking current to the value of the valve current at the near-zero flow rate only if the desired set point has changed from nonzero to zero, is at the predetermined percentage of a full scale value, and has been attained.

8. The method of claim 6, further comprising:
recording the value of the valve current when the fluid has a near-zero flow rate, before updating the valve cracking current.

9. A computer-usable medium having stored therein non-transitory computer-usable instructions for a processor, wherein the instructions when executed by the processor cause the processor to:
monitor a flow rate of a fluid in a mass flow controller, and a valve current through a valve in the mass flow controller when the valve is moving toward a closed position;
determine a value of the valve current when the fluid has a near-zero flow rate; and
update a previously determined value of the value of valve cracking current required to start moving the valve from the closed position, by setting the valve cracking current for a next run of the mass flow controller to the value of the valve current at the near-zero flow rate;
wherein the near-zero flow rate is defined as a predetermined percentage of maximum flow rate through the valve.

10. A mass flow controller configured to update a valve cracking current without requiring pressure information, the mass flow controller comprising:
a flow rate sensor configured to measure a flow rate of the fluid;
a valve operable to adjust the flow rate of the fluid to a desired set point, the valve configured to start moving from a closed position toward an open position when a valve current through the valve equals the valve cracking current; and
a valve controller configured to control position of the valve so as to adjust the flow rate of the fluid until an actual flow rate as measured by the flow rate sensor substantially equals the desired set point;
wherein the valve controller is further configured to:
monitor the valve current and the flow rate of the fluid, when the valve is moving to the closed position;
determine the valve current when the fluid has a near-zero flow rate; and
update a previously determined value of the valve cracking current for the next run of the mass flow controller by setting the updated valve cracking current to the value of the valve current at the near-zero flow rate;
wherein the near-zero flow rate is defined as a predetermined percentage of maximum flow rate through the valve.

11. The mass flow controller of claim 10, wherein the valve controller is further configured to receive the desired set point, compare the desired set point to the actual flow rate of the fluid as measured by the flow rate sensor, and if the actual flow rate does not equal the desired set point, adjust the position of the valve until the actual flow rate substantially equals the desired set point.

12. The mass flow controller of claim 11, wherein the valve controller is further configured to adaptively learn the updated valve cracking current for the next run, only when the desired set point is changed from nonzero to zero so that the valve is moving to the closing position, the received set point is at a predetermined percentage of a full scale value, and the actual flow rate has attained the received set point.

13. The mass flow controller of claim 10, wherein the valve actuator comprises at least one of: a solenoid actuator; a piezoelectric actuator; a stepper motor actuator; and a linear motor actuator.

14. The mass flow controller of claim 10, further comprising a flow body having an inlet and an outlet, the flow body configured to receive the fluid at the inlet and provide a flow path for the fluid between the inlet and the outlet; and
wherein the flow rate sensor is configured to measure the flow rate of the fluid through the flow path.

15. A valve system that allows the required value of valve cracking current of a valve of a mass flow controller to be updated, the mass flow controller being configured to control a flow rate (Q) of a fluid, the valve system comprising:
a valve movable between an open position and a closed position in response to a current (I) so as to adjust the flow rate of the fluid to a desired set point, wherein the valve cracking current is the minimum current required to start moving the valve from the closed position; and
a valve controller configured to control the valve so as to adjust the flow rate of the fluid until an actual measured flow rate of the fluid substantially equals the desired set point, the valve controller being further configured to:

(a) monitor the current (I) and the flow rate (Q) of the fluid, while the valve is closing and the valve current and the flow rate are both decreasing; and
(b) update a previously determined value of the value of valve cracking current for a next run of the mass flow controller as a function of the monitored current (I) and flow rate (Q), while the valve is closing and the valve current and the flow rate are both decreasing.

* * * * *